(12) United States Patent
Awazu

(10) Patent No.: US 7,920,205 B2
(45) Date of Patent: Apr. 5, 2011

(54) IMAGE CAPTURING APPARATUS WITH FLASH DEVICE HAVING AN LED ARRAY

(75) Inventor: Kouhei Awazu, Saitama (JP)

(73) Assignee: Fujifilm Corporation, Tokyo (JP)

( * ) Notice: Subject to any disclaimer, the term of this patent is extended or adjusted under 35 U.S.C. 154(b) by 754 days.

(21) Appl. No.: 11/919,078

(22) PCT Filed: May 26, 2006

(86) PCT No.: PCT/JP2006/311047
§ 371 (c)(1),
(2), (4) Date: Oct. 23, 2007

(87) PCT Pub. No.: WO2006/129777
PCT Pub. Date: Dec. 7, 2006

(65) Prior Publication Data
US 2009/0073275 A1    Mar. 19, 2009

(30) Foreign Application Priority Data

Jun. 1, 2005    (JP) ................................. 2005-161835

(51) Int. Cl.
*H04N 5/222* (2006.01)
*G03B 9/70* (2006.01)
*G03B 15/06* (2006.01)

(52) U.S. Cl. .................... 348/371; 396/164; 396/175
(58) Field of Classification Search .................. None
See application file for complete search history.

(56) References Cited

U.S. PATENT DOCUMENTS

| 7,346,196 B2 * | 3/2008 | Gin ................................ 382/118 |
| 7,551,848 B2 * | 6/2009 | Lee et al. ...................... 396/157 |
| 7,667,766 B2 * | 2/2010 | Lee et al. ...................... 348/370 |
| 2002/0025157 A1 | 2/2002 | Kawakami |
| 2002/0191102 A1 * | 12/2002 | Yuyama et al. ............... 348/370 |
| 2003/0071908 A1 | 4/2003 | Sannoh et al. |
| 2005/0046739 A1 * | 3/2005 | Voss et al. .................... 348/371 |

FOREIGN PATENT DOCUMENTS

| JP | 2000-338557 A | 12/2000 |
| JP | 2002-116481 A | 4/2002 |
| JP | 2002-148686 A | 5/2002 |
| JP | 2005-17812 A | 1/2005 |
| JP | 2005-277957 A | 10/2005 |
| JP | 2006-227228 A | 8/2006 |

\* cited by examiner

*Primary Examiner* — Justin P Misleh
(74) *Attorney, Agent, or Firm* — Birch, Stewart, Kolasch & Birch, LLP

(57) ABSTRACT

A digital camera (10) includes a face detecting section (74), a color temperature detecting section (76) and a flash device (86) having an LED array in which RGB LEDs are regularly arranged as a light source. When a shutter button (18) is pressed halfway, the face detecting section (74) reads out image data of a through image from a memory (60) and detects a person's face in the image. A CPU (64) identifies a scene based on brightness values of face and surrounding areas as, for example, a backlit scene, and specifies a face peripheral area according to an exposure pattern corresponding to the backlit scene. When the shutter button (18) is fully pressed, the CPU (64) sends a flash projection command to an LED control circuit (87), thereby illuminating the LEDs corresponding to the face peripheral area. By controlling illumination of the RGB LEDs, the LED control circuit (87) directs to project the flash light having color temperature that corrects the person's face color into an appropriate skin color.

18 Claims, 9 Drawing Sheets

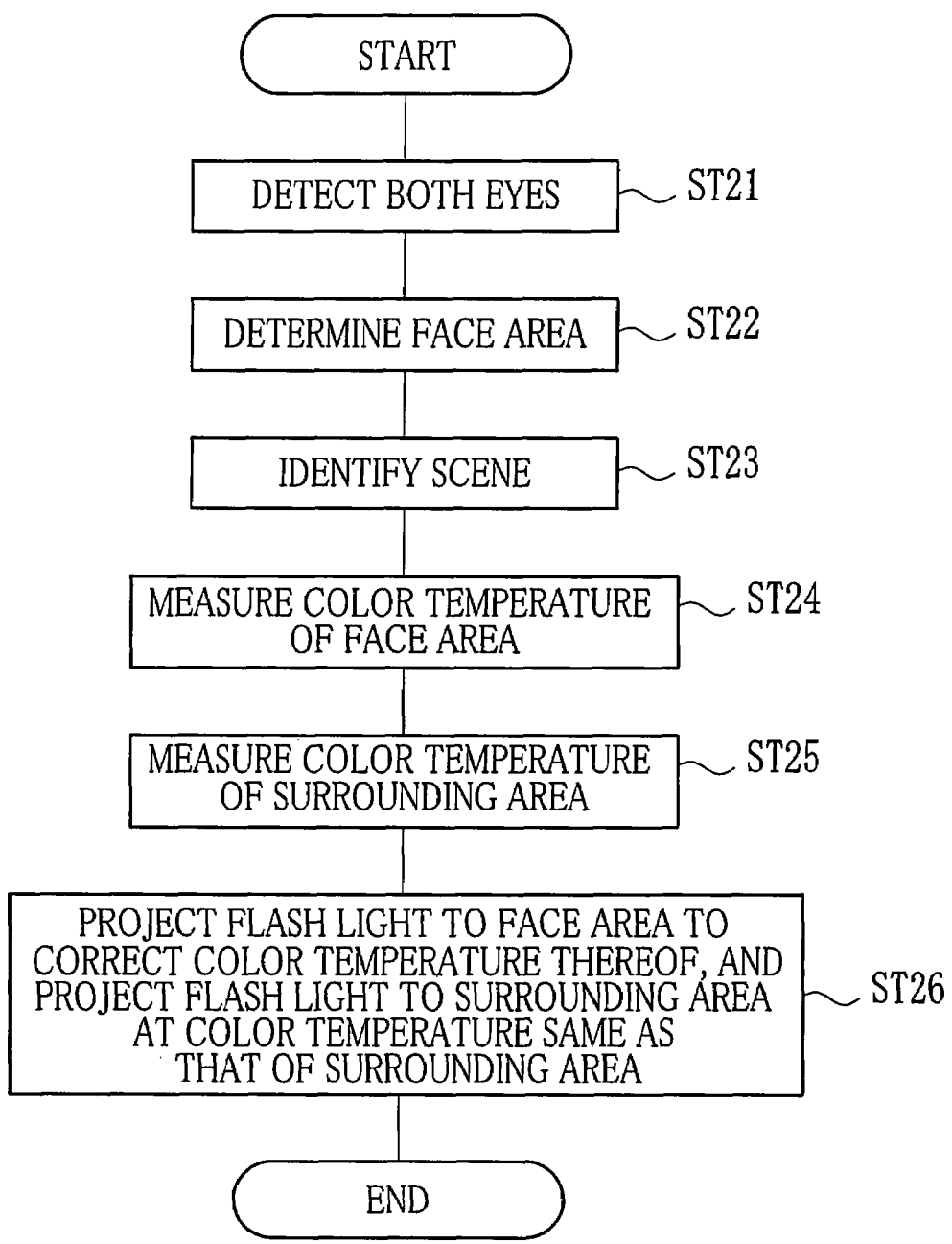

IMAGE CAPTURING APPARATUS WITH FLASH DEVICE HAVING AN LED ARRAY

TECHNICAL FIELD

The present invention relates to an image capturing apparatus, such as a digital camera or a cell-phone with camera, provided with a flash device having a light emitting diode array as a flash light source.

BACKGROUND ART

A silver halide camera and a digital camera are well known image capturing apparatuses. Many of these image capturing apparatuses are provided with a flash device and capable of capturing images with maintaining sufficient brightness by illuminating a subject even in low light conditions. In addition, a cell-phone with camera is widely used. Cell-phones with camera having a flash device are also available in the market in recent years.

A xenon tube has been used as a flash source of a conventional flash device. However, a flash device using a light emitting diode (hereinafter, LED) is proposed recently, since the LED produces less noise, is easy to be miniaturized and is manufactured at low cost.

For example, U.S. Patent Application Publication No. US2002/0025157 (corresponding to Japanese Patent Laid-Open Publication No. 2002-116481) discloses a digital camera that uses R, G and B LEDs as a light source of a flash device. This flash device controls a proportion of light emission amounts of the R, G and B LEDs according to a color temperature of the subject. Japanese Patent Laid-Open Publication No. 2002-148686 discloses a camera that uses a plurality of white LEDs having relatively narrow illumination angle. In this camera, criterial brightness information and brightness values obtained from each metering area by multi-metering are compared. Based on a result of the comparison, the LEDs are controlled to selectively emit light. For this configuration, the camera is capable of photographing with well-balanced brightness throughout a shooting area.

However, various problems occur in flash photography. For example, a person as a main subject may close his or her eyes when photographed with a flash light in a dim room, since the flash light is too bright. When there is a bright object in the middle of the shooting area, the flash light is emitted for short time if an auto-flash function is activated. As a result, the face of a main subject may be underexposed. Moreover, flash photography under the illumination of tungsten light hardly provides a vivid illustration of the shooting scene.

An object of the present invention is to provide an image capturing apparatus capable of emitting a flash light that is not too bright for a person as a main subject, and assures good color balance and uniform brightness throughout a whole frame.

DISCLOSURE OF INVENTION

In order to achieve the above and other objects, an image capturing apparatus of the present invention includes an image pickup section, a face detecting section, a flash device and a control section. The image pickup section picks up a subject to produce an image. The face detecting section detects a position and a size of a person's face in the image. The flash device has an LED array as a light source. The LED array has two-dimensionally arranged LEDs therein. The control section controls the flash device. The control section selectively illuminates the LEDs based on a detection result of the face detecting section so as to control a projection area of a flash light.

In a preferable embodiment of the present invention, the image capturing apparatus further includes a photometry section. The photometry section performs multi-metering to measure brightness of the subject. The control section selectively illuminates the LEDs based on the detection result of the face detecting section and a metering result of the photometry section so as to control the projection area and intensity of the flash light.

The LEDs are a plurality of red LEDs, green LEDs and blue LEDs arranged such that the LEDs having same color do not lie adjacent to each other. The LED array is divided into a plurality of groups, each of which separately illuminates one of divided projection areas in the subject in accordance with the metering result. Each of the groups has the same number of red LEDs, green LEDs and blue LEDs.

The projection area of the flash light can be a face peripheral area that includes the person's face in the subject. The projection area of the flash can also be a surrounding area that does not include the person's face in the subject.

The control section compares an average brightness value of the face peripheral area with a predetermined threshold value to determine the projection area and the intensity of the flash light. When the average brightness value of the face peripheral area is higher than the threshold value, the control section does not direct to project the flash light to the face peripheral area, while directing to project the flash light with high intensity to the surrounding area so that the average brightness value thereof becomes higher than the threshold value. When the average brightness value of the face peripheral area is lower than the threshold value, the control section directs to project the flash light with low intensity to the face peripheral area so that the average brightness value thereof becomes approximately equal to the threshold value, while directing to project the flash light with high intensity to the surrounding area so that the average brightness value thereof becomes higher than the threshold value.

In another preferable embodiment of the present invention, the image capturing apparatus further includes a color temperature detecting section. The color temperature detecting section detects color temperature of the subject. The control section controls illumination of the red LEDs, green LEDs and blue LEDs in each group based on the detection result of the face detecting section and a detection result of the color temperature detecting section so that the groups separately project the flash lights having different color temperature determined for each of the divided projection areas.

The control section directs to project the flash light to the divided projection areas including the person's face with color temperature that corrects a color of the face into an appropriate skin color. The control section directs to project the flash light to the divided projection areas not including the person's face with color temperature that is same as color temperature of the divided projection areas not including the person's face.

The face detecting section searches both eyes of the person in the image to detect the person's face. The face detecting section regards a midpoint of both eyes as the position of the person's face, and regards a distance between both eyes as the size of the person's face.

According to the present invention, the image capturing apparatus detects the position and the size of the person's face in the captured image, and selectively illuminates the LEDs based on the result of this detection to control the projection area of the flash light. Owing to this, the image capturing is performed with a flash light that is not too bright for the person as the main subject, and assures good color balance and uniform brightness throughout the whole frame.

Moreover, the image capturing apparatus detects the position and the size of the person's face in the captured image, and selectively illuminates the LEDs based on the result of this detection and the metering result of the photometry section to control the projection area and the intensity of the flash light. Owing to this, the image capturing is performed with a flash light that is not too bright for the person as the main subject, and assures good color balance and uniform brightness throughout the whole frame.

Furthermore, the image capturing apparatus detects the position and the size of the person's face in the captured image, and controls illumination of the red LEDs, green LEDs and blue LEDs in each group based on the result of this detection and the detection result of the color temperature detecting section so that the groups separately project the flash lights having different color temperature determined for each of the divided projection areas. Owing to this, the image capturing is performed with a flash light that is not too bright for the person as the main subject, and assures good color balance and uniform brightness throughout the whole frame.

BRIEF DESCRIPTION OF DRAWINGS

FIG. 14 is a flowchart of the image capturing process in the tungsten-illuminated scene.

BEST MODE FOR CARRYING OUT THE INVENTION

Figure 1:
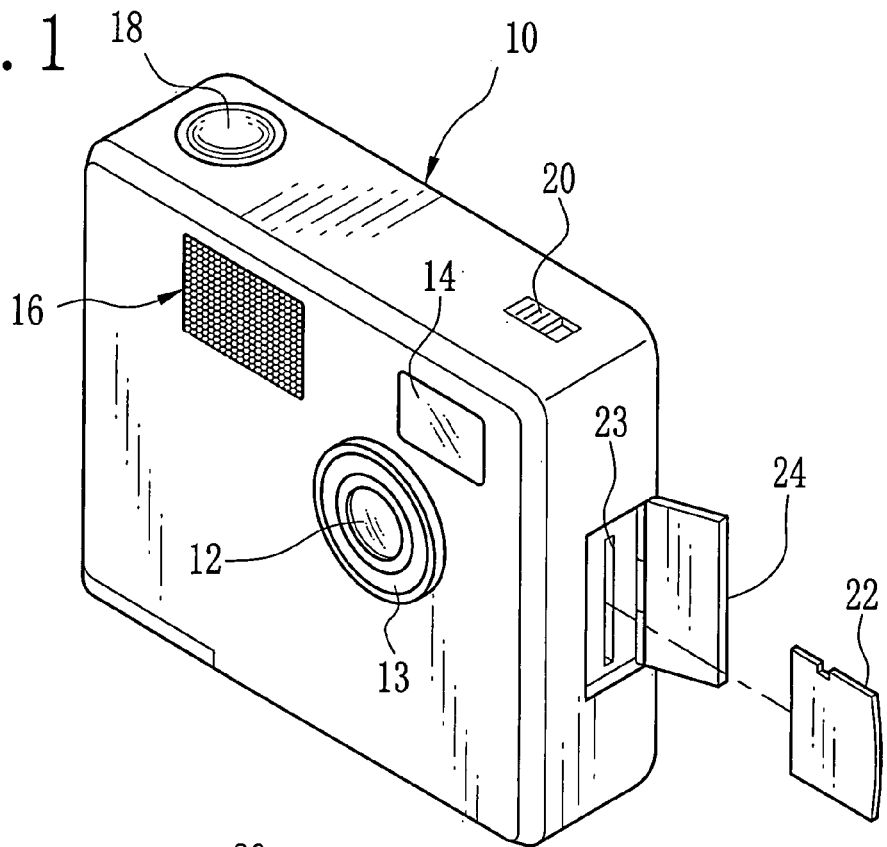
FIG. 1 is a front perspective view illustrating a digital camera to which the present invention is applied.

In FIG. 1, a front surface of a digital camera 10 is provided with a taking lens unit 13, a viewfinder window 14 and a flash projector 16. A top surface of the digital camera 10 is provided with a shutter button 18 and a power switch 20. A left side surface of the digital camera 10 is provided with a memory card slot 23 into which a memory card 22 is inserted. The memory card slot 23 is openably closed by a lid 24.

The taking lens unit 13 has a zoom lens system 12. A CCD image sensor (hereinafter, CCD) 27 is arranged behind the zoom lens system 12 (see FIG. 5). When the shutter button 18 is pressed halfway, face detection, color temperature detection and scene identification, which are described later in detail, are performed, and at the same time, auto-focus (AF) and auto-exposure (AE) controls are activated to lock AF and AE. When the shutter button 18 is fully pressed, image capturing (photographing) is performed.

The power switch 20 also functions as a mode change-over switch. The power switch 20 is switchable among three positions: off position, capture position and playback position. The off position is for turning off the power. The capture position is for selecting still image capture mode. The playback position is for selecting playback mode. Note that the power is turned on when the power switch 20 is set in the capture position or the playback position.

Figure 2:
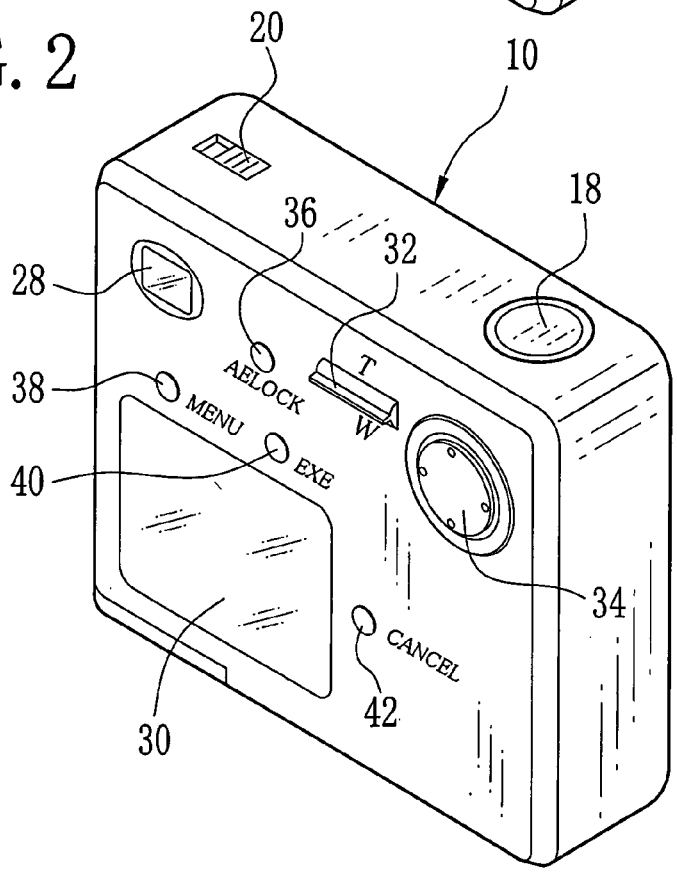
FIG. 2 is a rear perspective view illustrating the digital camera.

In FIG. 2, a rear surface of the digital camera 10 is provided with a finder 28, an LCD monitor 30, a zoom button 32, a four-way arrow pad 34, an AE lock button 36, a menu button 38, an execution button 40 and a cancel button 42. The LCD monitor 30 is used as an electronic finder to check field angle for capturing images. The LCD monitor 30 also displays previews of the captured images or reproduced images read out from the memory card 22, or the like. In addition, menu selection and various settings in each menu are also executed on the screen of the LCD monitor 30 by operating the four-way arrow pad 34.

The zoom button 32 is a lever button movable up and down. When the zoom button 32 is moved up, the zoom lens system 12 is zoomed in a telephoto direction. When the zoom button 32 is moved down, the zoom lens system 12 is zoomed in a wide direction. By pressing one of the arrows of the four-way arrow pad 34, command corresponding to each arrow is input. The four-way arrow pad 34 is used as an operation button to select each setting item or to change settings on the menu screen. The four-way arrow pad 34 is also used to adjust the electronic zooming magnification or to scroll through captured images.

The menu button 38 is used to switch display from normal screen of each mode to the menu screen. The execution button 40 is used to confirm the selection or to execute processing. The cancel button 42 is used to cancel the item selected from the menu or to return to the former operation status.

While observing through the finder 28 or observing a through image displayed on the LCD monitor 30, a user determines the field angle by operating the zoom button 32. After the field angle is determined, an image is captured by fully pressing the shutter button 18.

Figure 3:
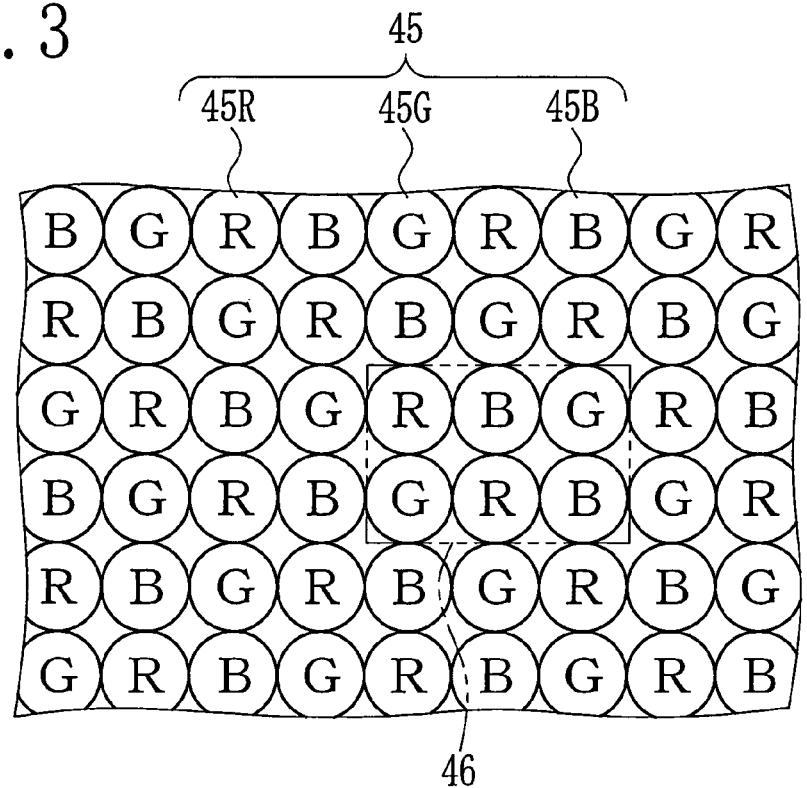
FIG. 3 is an explanatory view illustrating an LED array constituting a flash device.
Figure 4:
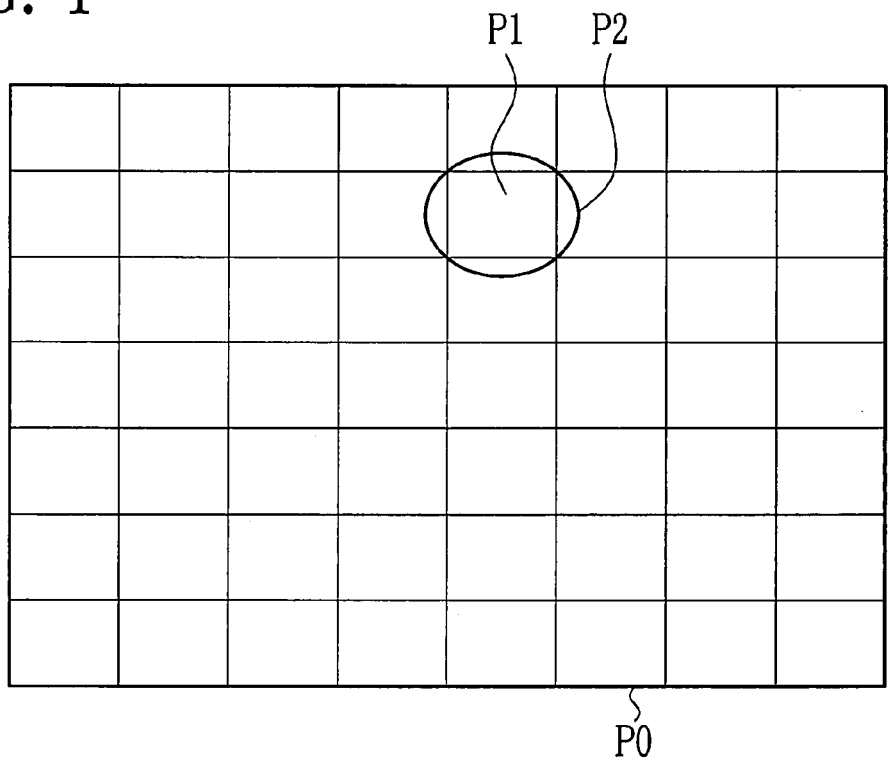
FIG. 4 is an explanatory view illustrating an image plane divided into a plurality of areas and an actual projection area of a flash light.

As shown in FIG. 3, the flash projector 16 is constituted of a two-dimensional LED array 45 having a plurality of red (R), green (G) and blue (B) LEDs 45R, 45G and 45B arranged in matrix. In the LED array 45, the adjacent six LEDs of two horizontal rows and three vertical columns (two of each LEDs 45R, 45G and 45B) form one group. Meanwhile, as shown in FIG. 4, an image plane P0 is virtually divided into a plurality of rectangular areas. Each divided area is defined as a divided projection area. One group of the LED array 45 illuminates one divided projection area. For example, a group 46 surrounded by a chain double-dashed line (see FIG. 3) illuminates a divided projection area P1 (see FIG. 4).

The divided projection area P1 is of rectangular shape. However, an actual projection area P2 of the six LEDs 45R, 45G and 45B at full emission is not rectangular, but is in oval shape extending off the divided projection area P1. Amount of light of the portion extended off the divided projection area P1 is relatively small, and therefore it will not cause any problem. When all of the six LEDs 45R, 45G and 45B are fully illuminated at the same time, the flash light becomes white light. Color temperature of the flash light can be adjusted with respect to each divided projection area by changing the number of LEDs to be illuminated color by color, or by changing light intensity of the LEDs.

Figure 5:
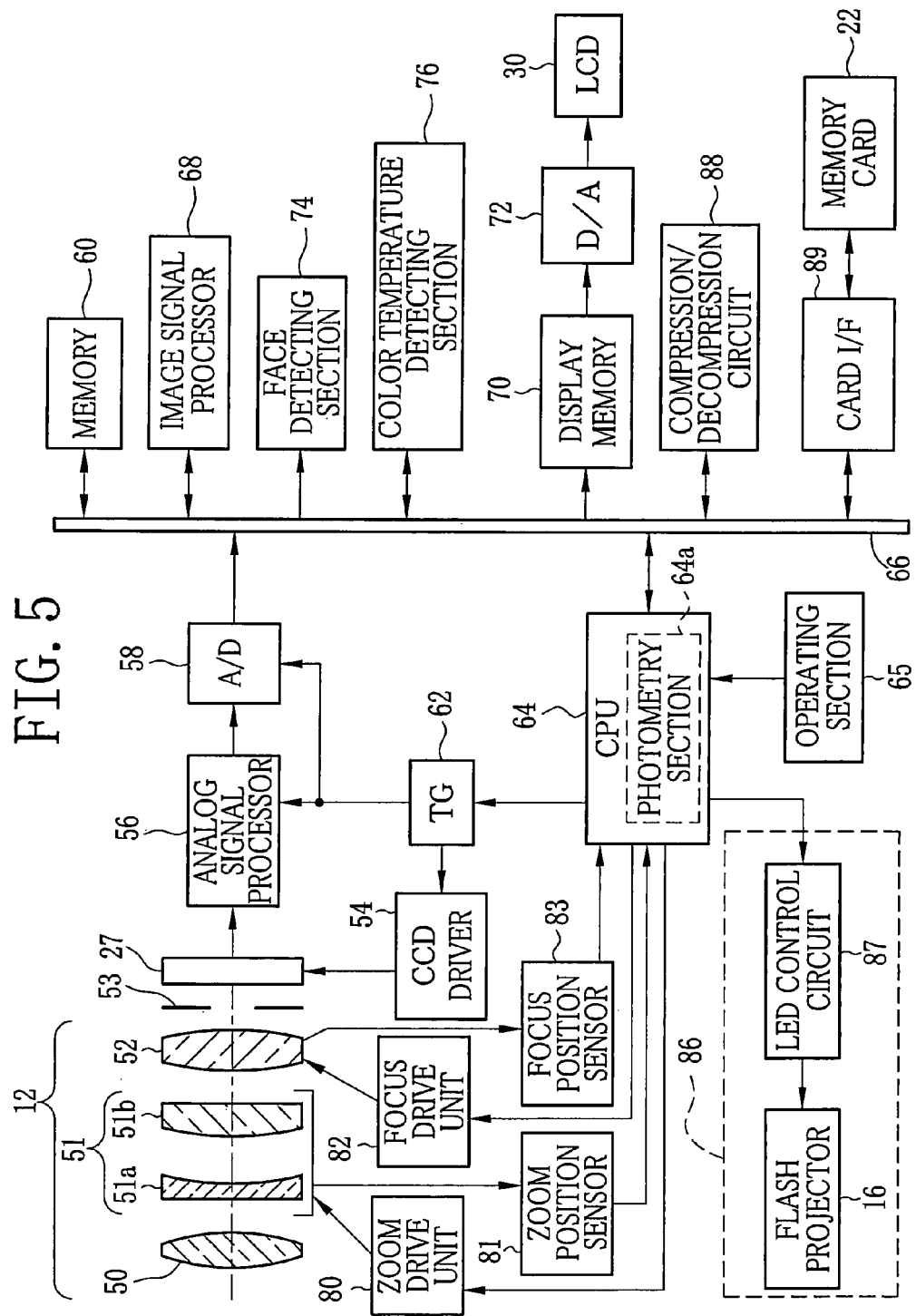
FIG. 5 is a block diagram illustrating an electrical structure of the digital camera.

In FIG. 5, the zoom lens system 12 is constituted of four inner focus type zoom lenses: a fixed lens 50, a magnification lens 51a, a correcting lens 51b and a focus lens 52.

The magnification lens 51a and the correcting lens 51b moves along an optical axis to change focal length while their positional relation is regulated by a cam mechanism (not shown). Note that the magnification lens 51a and the correcting lens 51b together are hereinafter referred to as a zoom lens 51 for the sake of convenience.

After passing though the zoom lens system 12, light is regulated in its quantity by an aperture 53 and enters the CCD 27. On a photoelectric surface of the CCD 27, R, G and B micro color filters are arranged in matrix. Behind each R, G and B micro color filter, a MOS diode (MOS capacitor) is arranged.

Based on a pulse from a CCD driver 54, signal charge accumulated in each MOS diode is transferred and sequentially output from the CCD 27 as a voltage signal (image signal) having R, G and B brightness information corresponding to the signal charge. Note that the CCD 27 has a so-called electronic shutter function controlling the charge-accumulation time (shutter speed) of each MOS diode in accordance with timing of the shutter gate pulse.

The image signal output from the CCD 27 is sent to an analog signal processor 56. The analog signal processor 56 has signal processing circuits, such as a sampling hold circuit, a color separation circuit and a gain adjustment circuit. The analog signal processor 56 applies correlation double sampling (CDS), color separation into each color of R, G and B and signal level adjustment of each color signal (pre-white balance process) over the image signal.

The signal output from the analog signal processor 56 is digitized in an A/D converter 58 and stored in a memory 60. A timing generator (TG) 62 sends a timing signal to the CCD driver 54, the analog signal processor 56, and the A/D converter 58 under the control of a CPU 64. Owing to the timing signal, these circuits are synchronized.

The CPU 64 controls each of the circuits of the digital camera 10. The CPU 64 controls the operation of each circuit in accordance with the input signal from an operating section 65 constituted of the power switch 20, the shutter button 18, the zoom button 32 and the like. The CPU 64 also performs flash control, display control of the LCD monitor 30, AF and AE controls, and the like.

Data stored in the memory 60 is sent to an image signal processor 68 via a bus 66. The image signal processor 68 is an image processing device constituted of a digital signal processor (DSP) including a brightness signal/color-difference signal producing circuit, a γ-correction circuit, a sharpness correction circuit, a contrast correction circuit, a white balance correction circuit and the like. The image signal processor 68 processes the image signals under the control of the CPU 64.

The image data input to the image signal processor 68 is converted into a brightness signal (Y signal) and a color-difference signal (Cr, Cb signal) in the brightness signal/color-difference signal producing circuit, and also applied a predetermined processing like γ-correction, and then stored in the memory 60.

The CPU 64 also functions as a photometry section 64a. The CPU 64 divides an image S0 of one frame stored in the memory 60 into a plurality of areas. Each of the divided areas is defined as a divided area S1 (see FIG. 6). The CPU 64 then obtains each divided area S1's integrated value of the brightness signal (brightness value). The brightness value of each divided area S1 is referred in the identification of scenes or the settings of shutter speed and f-number. Note that the image S0 of one frame is divided in the same manner as the image plane P0 is divided, and the divided area S1 corresponds one-to-one with the divided projection area P1.

The memory 60 stores a plurality of scene patterns with various combinations of different brightness and color temperature for identifying scenes. The memory 60 also stores a plurality of exposure patterns (including light distribution patterns of the flash light) corresponding to each scene pattern to perform optimal exposure.

In order to display a through image on the LCD monitor 30, the image data is read out from the memory card 60 and transferred to a display memory 70. The data stored in the display memory 70 is converted into a signal of predetermined form (for example, an NTSC composite color video signal) and output to the LCD monitor 30 via a D/A converter 72. Image contents of the image data are displayed on the LCD monitor 30 in this way.

The image being captured by the CCD 27 is written in the display memory 70 through the memory 60 at regular intervals. Accordingly, the image being captured by the CCD 27 is displayed on the LCD monitor 30 in real time. The user can check the subject by observing the through image displayed on the LCD monitor 30 or by observing through the optical finder 28.

When the shutter button 18 is pressed halfway, the image data of the through image is read out from the memory 60 and taken into a face detecting section 74. The face detecting section 74 searches both eyes of a person from the image data to detect the person's face.

Figure 6:
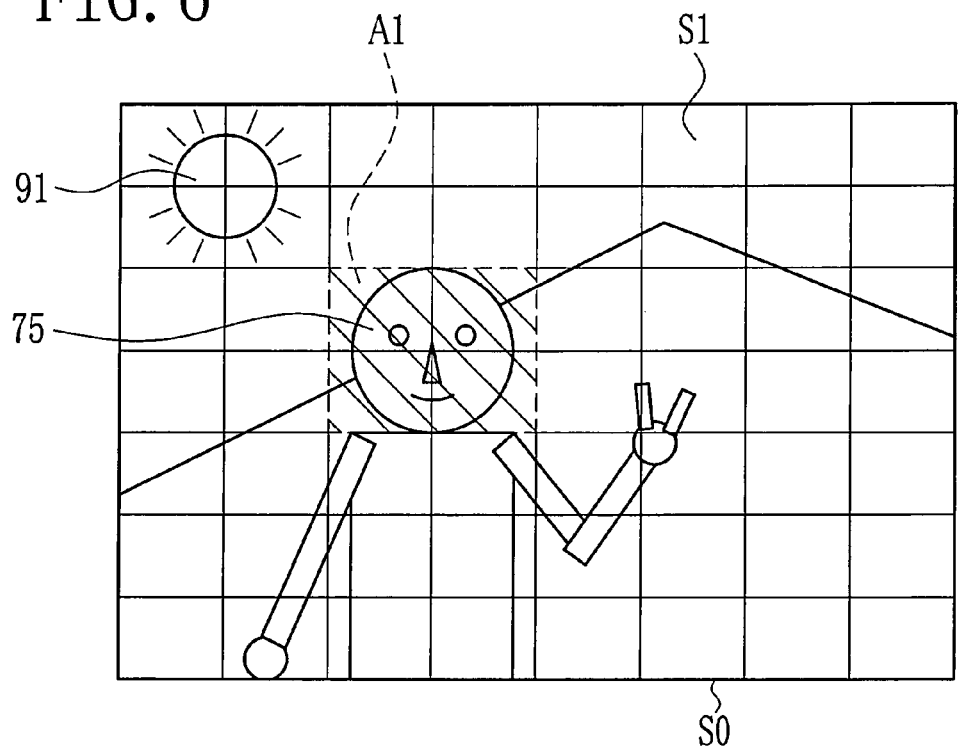
FIG. 6 is an explanatory view of an image of one frame divided into a plurality of areas part of which illustrates a face area in a backlit scene.

In searching both eyes of the person, the face detecting section 74 picks out the divided areas S1 having relatively many pixels estimated to be of skin color, which are illustrated by diagonal lines in FIG. 6, by referring each R, B and G signal's level of each divided area S1. Within the divided areas S1 with many of the skin color pixels, the face detecting section 74 searches pixels of, for example, iris color and white pixels around the iris color pixels, which correspond to the white parts of an eyeball. In this way, one of the eyes is detected. The face detecting section 74 then analyzes the area around the detected eye to detect the other eye. After coordinates of both eyes of the person 75 are obtained in the image, a midpoint thereof is obtained as a representative point of a face position. In this way, the person 75's face position is determined.

Figure 7:
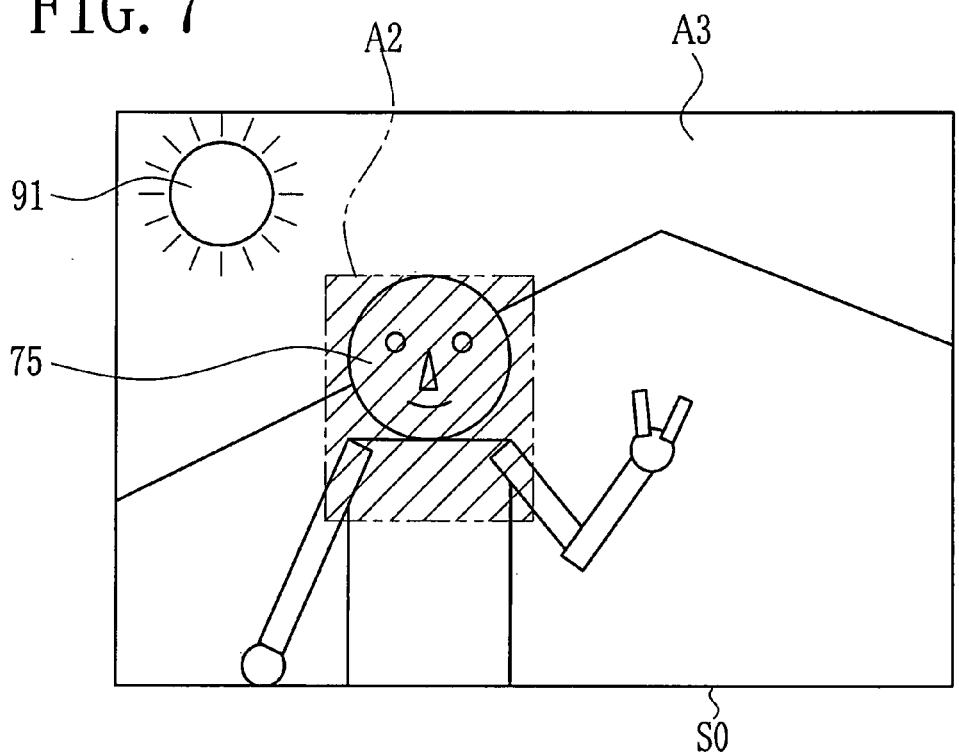
FIG. 7 is an explanatory view of the image of one frame illustrating a face peripheral area in the backlit scene.

The face detecting section 74 determines the area having many skin color pixels around the face position of the person 75 as a face area A1 (area surrounded by a dashed line). In a backlit scene as illustrated in FIG. 6, for example, the areas downwardly broader than the face area A1 is specified as a face peripheral area A2 (area surrounded by a chain double-dashed line) (see FIG. 7). The face peripheral area A2 is a targeted area of the flash projection. In this example, the face area A1 has the dimension of four divided areas S1 and the face peripheral area A2 has the dimension of six divided areas S1, as can be seen from FIG. 6.

A color temperature detecting section 76 is connected to the bus 66. The color temperature detecting section 76 refers the R, G and B signals of the image S0 of one frame stored in the memory 60 and obtains each divided area S1's average integrated value of the R, G and B signals by color. Based on the average integrated value of each divided area S1, the color temperature detecting section 76 identifies light sources, such as the sun, a candle, a fluorescent lamp, a tungsten lamp and the like. That is, the color temperature detecting section 76 identifies the color temperature.

In order to identify the color temperature, R/G ratio and B/G ratio are obtained from the average integrated value of each R, G and B signal of each divided area S1. On a color temperature scale with an R/G lateral axis and a B/G longitudinal axis, a detection frame that delimits a range of the color distribution corresponding to each color temperature is specified. Based on the R/G and B/G ratios of each divided area S1, the number of the divided areas S1 included in the detection frame is counted. Based on the brightness level of the person 75 and the number of the divided areas S1 in the detection frame, the color temperature is identified.

When the user operates the zoom button 32, the operation signal is input to the CPU 64. Based on the signal from the zoom button 32, the CPU 64 controls a zoom drive unit 80 to move the zoom lens 51 to the telephoto direction or the wide direction. The zoom drive unit 80 has a motor (not shown), whose driving force moves the zoom lens 51. The position of the zoom lens 51 (zoom position) is detected by a zoom position sensor 81. The zoom position sensor 81 inputs the detection signal to the CPU 64.

A focus drive unit 82 also has a motor (not shown), whose driving force moves the focus lens 52 back and forth along the optical axis. The position of the focus lens 52 (focus position) is detected by a focus position sensor 83. The focus position sensor 83 inputs the detection signal to the CPU 64.

When the power switch 20 is set in the capture position, the still image capture mode is selected. By pressing the shutter button 18, a capture (shutter release) signal is sent out. The CPU 64 detects the shutter release signal and executes a sill image capture operation. The CPU 64 also sends a command as necessary to an LED control circuit 87 of a flash device 86 to project the flash light by driving the LED array 45 of the flash projector 16 at the time of capturing the still image.

The LED control circuit 87 is provided with a boost converter, a condenser and the like. The boost converter boosts the voltage of a power source battery. The condenser is charged by the boosted voltage. Under the control of the CPU 64, the LEDs of at least one selected group in the LED array 45 are applied high-voltage current from the condenser for predetermined time, and thus the LEDs illuminates.

In response to the full pressing of the shutter button 18, the image data of the still image is taken in. When a compression recording mode is selected for the image data, a compression/decompression circuit 88 compresses the image data taken in the memory 60 into a predetermined format like JPEG under the control of the CPU 64. The compressed image data is recorded in the memory card 22 via a card interface (I/F) 89.

When an uncompression recording mode is selected for the image data, the compression processing in the compression/decompression circuit 88 is omitted and the uncompressed image data is recorded in the memory card 22.

When the power switch 20 is set in the playback position to select the playback mode, an image file is read out from the memory card 22. The read out image data is compressed in the compression/decompression circuit 88 as necessary and output to the LCD monitor 30 via the display memory 70.

Next, image capturing in a backlit scene is explained. First of all, the power switch 20 is set in the capture position to select the still image capture mode. This will initiate the charging of the condenser incorporated in the LED control circuit 87. When the shutter button 18 is pressed halfway with the digital camera 10 directed toward the subject, the CPU 64 executes the face detection, the color temperature detection, the scene identification and the like.

Figure 8:
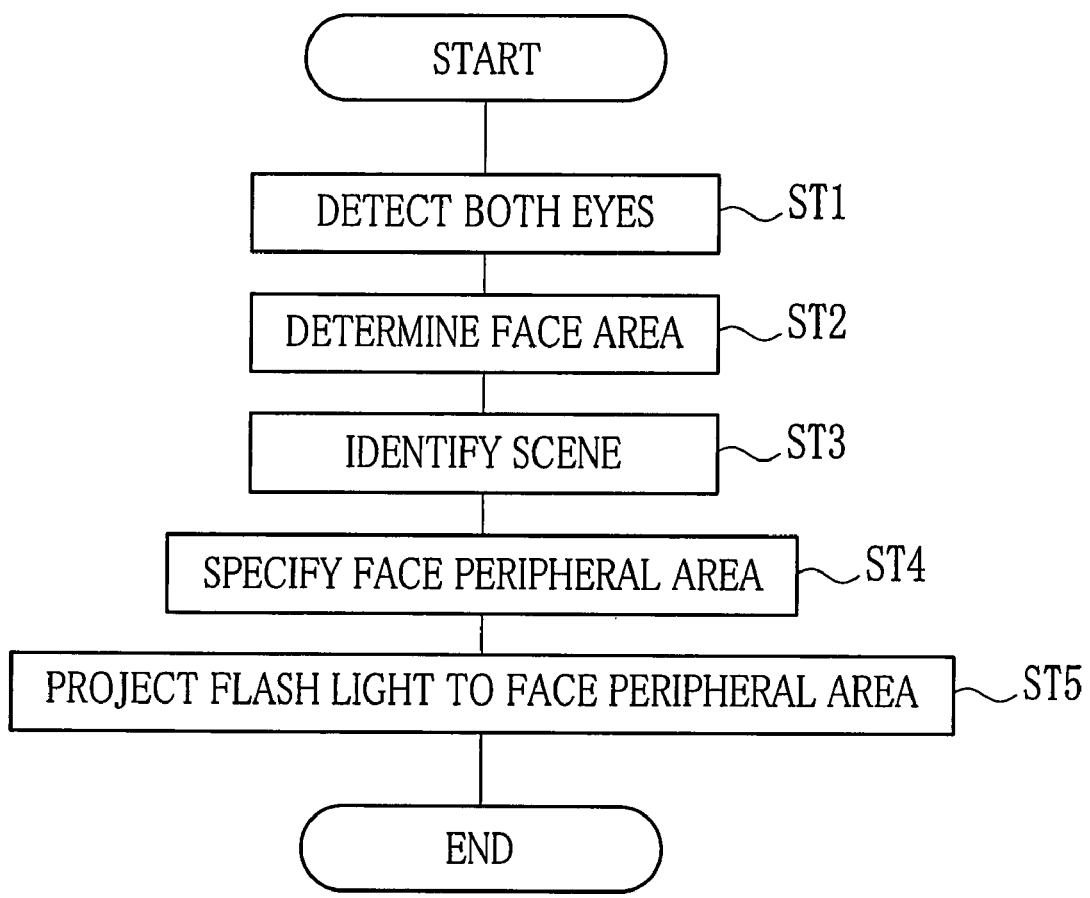
FIG. 8 is a flowchart of an image capturing process in the backlit scene.

As shown in FIG. 8, the face detecting section 74 reads out the image data of the through image stored in the memory 60 and detects the person 75's face in the image S0 of one frame. The face detecting section 74 picks out the divided areas S1 having relatively many of the skin color pixels. Within the divided areas S1 with many of the skin color pixels, the face detecting section 74 detects the divided areas S1 including both eyes of the person 75 (ST1). After obtaining the coordinates of both eyes, the face detecting section 74 regards the midpoint thereof as the face position of the person 75. The face detecting section 74 then determines the face area A1 in accordance with the face position and the divided areas S1 having many skin color pixels (ST2).

The CPU 64 performs the multi-metering for each divided area S1. According to the brightness values of the face area A1 and the divided areas S1, the CPU 64 identifies a scene (ST3). In the image illustrated in FIGS. 6 and 7, a high brightness light source, which is the sun 91, is detected in a surrounding area A3, which does not include the face area A1. Accordingly, the CPU 64 identifies this scene as the backlit scene. The CPU 64 then reads out the exposure pattern that corresponds to the backlit scene, from the memory 60. In accordance with the read out exposure pattern, the CPU 64 specifies the face peripheral area A2 downwardly broader than the face area A1 (ST4).

When the shutter button 18 is fully pressed, the CPU 64 sends the flash projection command to the LED control circuit 87, thereby illuminating the selected LEDs 45R, 45G and 45B corresponding to the face peripheral area A2 (ST5). In this case, all of the LEDs 45R, 45G and 45B corresponding to the face peripheral area A2 are fully illuminated at the same time to project the white light around the face of the person 75. Owing to this, the person 75's face and the lower part thereof, which are often underexposed in the usual photography, can be appropriately illuminated by the flash light. Meanwhile, since the LEDs 45R, 45G and 45B corresponding to the surrounding area A3 are not illuminated at this time, the battery power will not be wasted.

The image signal output from the CCD 27 is taken into the memory 60 as the image data after going through the analog signal processor 56 and the A/D converter 58. The image data is then compressed in the compression/decompression circuit 88 into the predetermined format and recorded in the memory card 22 via the card I/F 89.

Figure 9:
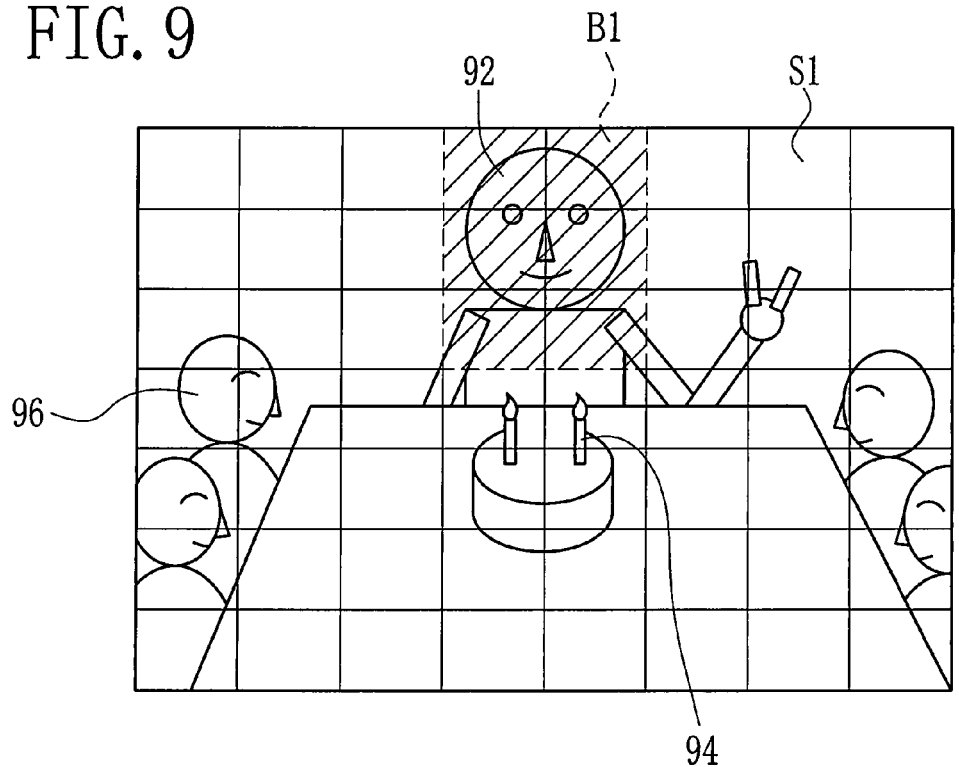
FIG. 9 is an explanatory view of image of one frame divided into a plurality of areas part of which illustrates the face area in a candle-lit scene.
Figure 10:
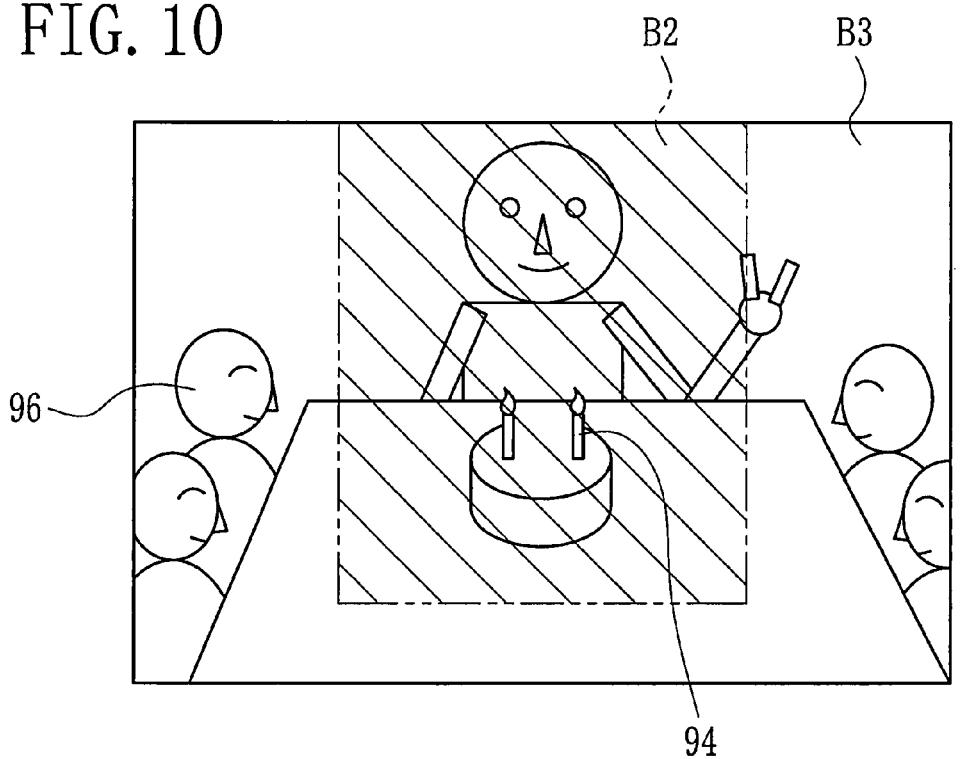
FIG. 10 is an explanatory view of the image of one frame illustrating the face peripheral area in the candle-lit scene.
Figure 11:
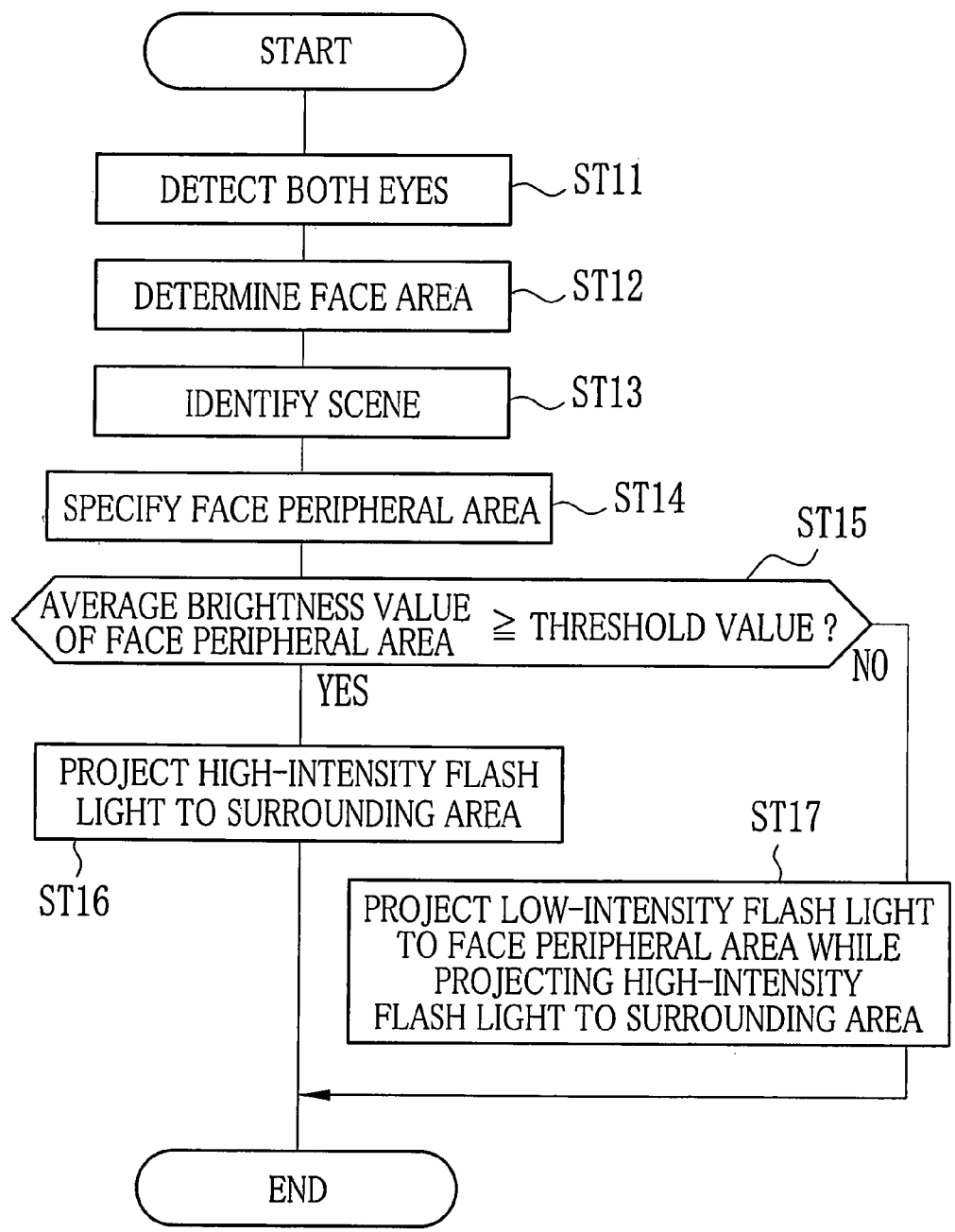
FIG. 11 is a flowchart of the image capturing process in the candle-lit scene.

Next, image capturing in a birthday party scene as illustrated in FIGS. 9 and 10 is explained. As shown in FIG. 11, the face detecting section 74 detects both eyes of a main person 92 upon the halfway pressing of the shutter button 18 (ST11). The face detecting section 74 then determines a face area B1 (area surrounded by a dashed line) (ST12). The CPU 64 performs the multi-metering for each divided area S1 to identify the scene (ST13). In the image illustrated in FIGS. 9 and 10, relatively low brightness light sources, which are candles 94, are detected only near the face area B1, and the brightness of the screen periphery is quite low. Accordingly, the CPU 64 identifies this scene as a candle-lit scene and reads out the exposure pattern that corresponds to the candle-lit scene, from the memory 60. In accordance with the read out exposure pattern, the CPU 64 specifies a face peripheral area B2 that is one size larger than the face area B1 (area surrounded by a chain double-dashed line) (ST14). Note that the face area B1 has the dimension of six divided areas S1 and the face peripheral area B2 has the dimension of twenty four divided areas S1 in the present embodiment.

The CPU 64 compares the average brightness value of the face peripheral area B2 with a predetermined threshold value (ST15). When the average brightness value of the face peripheral area B2 is higher than the threshold value, the LEDs 45R, 45G and 45B corresponding to the face peripheral area B2 are not illuminated, while those corresponding to a surrounding area B3, which is around the face peripheral area B2, are illuminated, upon the full pressing of the shutter button 18 (ST16).

The intensity of the flash light at this time is high (high-intensity flash light) enough to make average brightness value of the surrounding area B3 higher than the threshold value so that surrounding people 96 are captured clearly. Note that the threshold value is a brightness value that allows to capture the main person 92's face clearly without ruining the atmosphere of the shooting scene.

When the average brightness value of the face peripheral area B2 is lower than the threshold value, the LEDs 45R, 45G and 45B corresponding to the face peripheral area B2 are illuminated with low intensity (low-intensity flash light) so that the average brightness value thereof becomes approximately equal to the threshold value, while those corresponding to the surrounding area B3 are illuminated with high intensity (high-intensity flash light) so that the average brightness value thereof becomes higher than the threshold value, upon the full pressing of the shutter button 18 (ST17).

In the candle-lit scene, the main person 92's pupils are large since the surrounding environment is relatively dark. Therefore, the high-intensity flash light may damage his/her eyes and cause red-eye phenomenon that causes the pupil area of the eye to appear red. In the above embodiment, the LEDs are selectively illuminated to change the projection area or the intensity of the flash light. Owing to this, the image capturing with the flash light that is not too bright for the main person 92 and assures good color balance and uniform brightness throughout the frame becomes possible, and also prevents the red-eye phenomenon.

Figure 12:
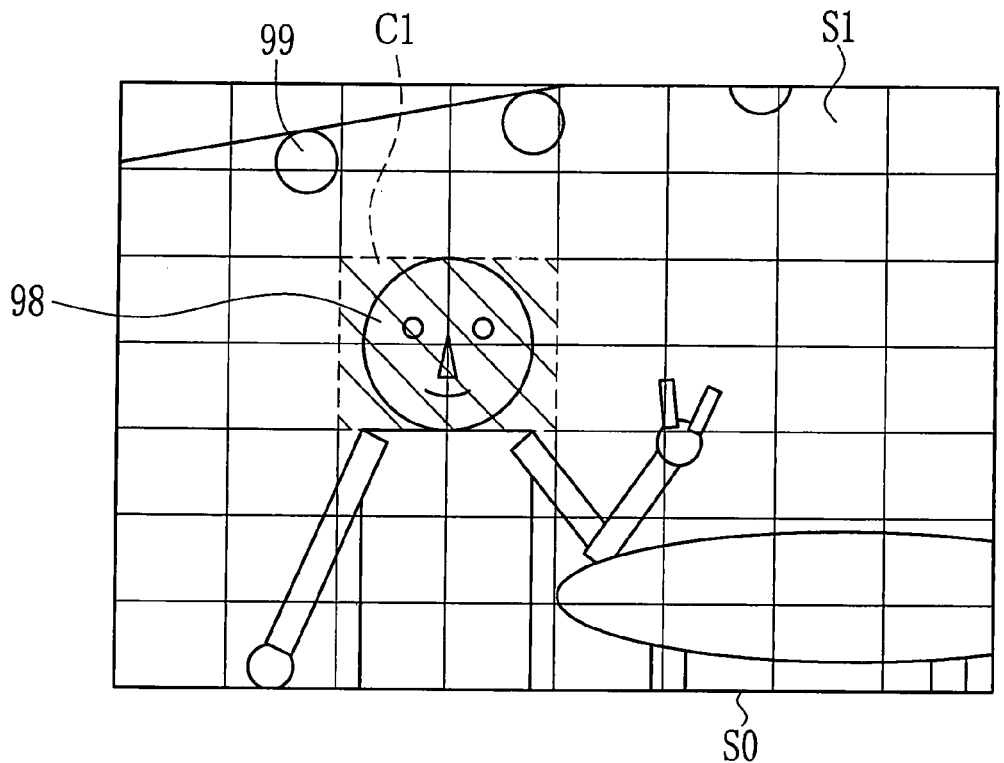
FIG. 12 is an explanatory view of the image of one frame divided into a plurality of areas part of which illustrates the face area in a tungsten-illuminated scene.
Figure 13:
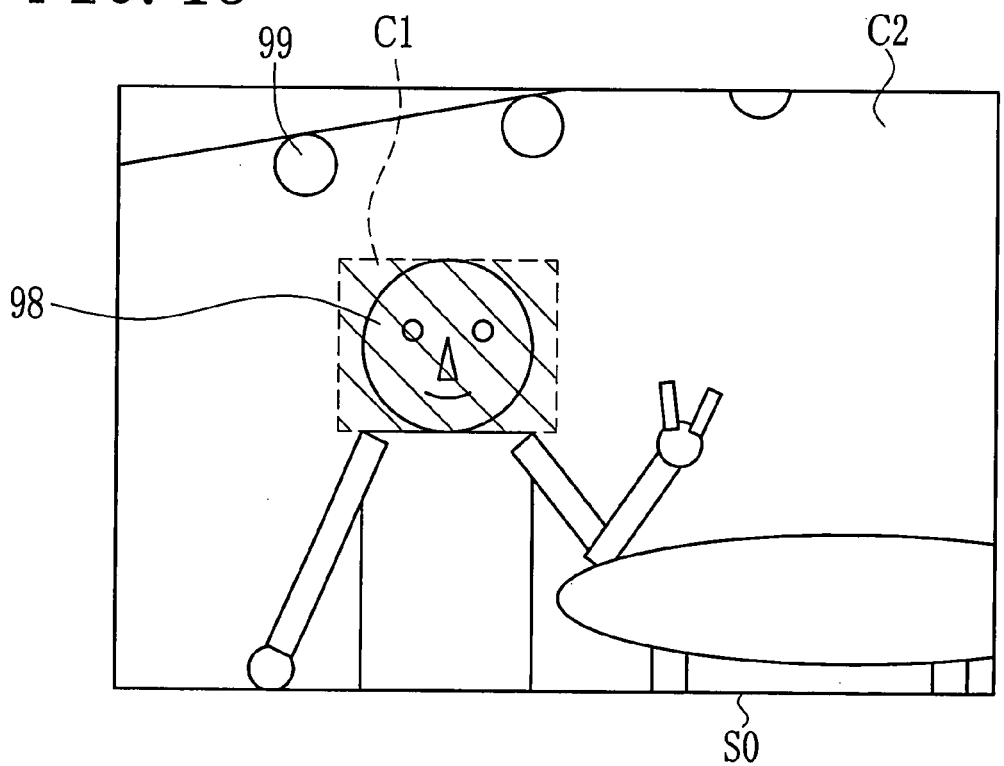
FIG. 13 is an explanatory view of the image of one frame illustrating the face area in the tungsten-illuminated scene.

Next, image capturing in a lamp-lit room as illustrated in FIGS. 12 and 13 is explained. As shown in FIG. 14, the face detecting section 74 detects both eyes of a person 98 upon the halfway pressing of the shutter button 18 (ST21). The face detecting section 74 then determines a face area C1 (area surrounded by a dashed line) (ST22). The CPU 64 performs the multi-metering for each divided area S1 to identify the scene (ST23). In the image illustrated in FIGS. 12 and 13, a plurality of point light sources, which are tungsten lamps 99, is detected above the person 98, and the brightness of the whole screen of the image S0 is relatively low. Accordingly, the CPU 64 identifies the scene is indoor illuminated by tungsten lamps or ball-shape fluorescent bulbs, or outdoor at nighttime.

The CPU 64 then measures color temperature of the face area C1 (ST24) and that of a surrounding area C2 (ST25), which does not include the face area C1, based on the detection result of the color temperature detection performed for each divided area S1 by the color temperature detecting section 76. According to the measurement result, the CPU 64 identifies that this scene is a tungsten-illuminated scene where the face area C1 and the surrounding area C2 are both illuminated amber by the tungsten lamps.

When the shutter button 18 is fully pressed, the LEDs 45R and 45G corresponding to the face area C1 are illuminated with low intensity or not illuminated at all, whereas the LEDs 45B corresponding to the same area are illuminated with high intensity so that the person 98's face color is corrected into an appropriate skin color. At the same time, the LEDs 45R corresponding to the surrounding area C2 are illuminated with high intensity, whereas the LEDs 45G and 45B corresponding the same area are illuminated with low intensity or not illuminated at all so that the color temperature of the flash light becomes relatively equal to that of the surrounding area C2 (ST26). Whether the LEDs are illuminated with low intensity or not illuminated at all is decided in accordance with the comparisons of the brightness value of the areas C1 and C2 with a predetermined threshold value.

For this configuration, it is possible to capture the person 98's face with appropriate skin color without ruining the atmosphere of the shooting scene. In addition, since the image capturing is performed with the flash light, camera shake is also prevented. When the average brightness of the person 98 is higher than the predetermined threshold value (relatively bright), the flash light having color temperature that corrects the color of the face area C1 is only projected, and no flash is projected to the surrounding area C2.

In the above embodiment, although the light intensity, projection areas, color temperature of the flash light are automatically set by the digital camera, it is also possible that the user manually sets up these items every time he or she captures an image. In the above embodiment, although the flash light that does not ruin the atmosphere of the shooting scene is used for the image capturing, the flash light having the color temperature intentionally changed to be different from that of the subject environment can also be used so as to create a different atmosphere.

In the above embodiment, although the LEDs are used as the light source of the flash light, the present invention is not limited to this. For example, a self-luminous semiconductor element such as a compact lamp or an electroluminescence (EL) may be used. Moreover, a combination of liquid crystal panels of three-color may also be used as the light source.

INDUSTRIAL APPLICABILITY

The image capturing apparatus of the present invention is suitably used for digital cameras, cell-phones with camera, and so forth.

The invention claimed is:

1. An image capturing apparatus having an image pickup section for picking up a subject to produce an image, said image capturing apparatus comprising:
   a face detecting section for detecting a position and a size of a face of a person in said image;
   a flash device having an LED array as a light source, said LED array having two-dimensionally arranged LEDs therein;
   a control section for controlling said flash device, said control section selectively illuminating said LEDs based on a detection result of said face detecting section so as to control a projection area of a flash light;
   a photometry section for performing multi-metering to measure brightness of said subject, wherein said control section selectively illuminates said LEDs based on said detection result of said face detecting section and a metering result of said photometry section so as to control said projection area and intensity of said flash light;
   wherein said LEDs are a plurality of red LEDs, green LEDs and blue LEDs arranged such that said LEDs having same color do not lie adjacent to each other in said LED array, and wherein said LED array is divided into a plurality of groups, each of which separately illuminates one of divided projection areas in said subject in accordance with said metering result, said groups each having same number of said red LEDs, said green LEDs and said blue LEDs.

2. An image capturing apparatus as claimed in claim 1, wherein said projection area of said flash light is a face peripheral area including said person's face in said subject.

3. An image capturing apparatus as claimed in claim 1, wherein said projection area of said flash light is a surrounding area not including said person's face in said subject.

4. An image capturing apparatus as claimed in claim 1, wherein said control section compares an average brightness value of a face peripheral area including said face with a predetermined threshold value to determine said projection area and said intensity of said flash light.

5. An image capturing apparatus as claimed in claim 4, wherein when said average brightness value of said face peripheral area is higher than said threshold value, said control section does not direct to project said flash light to said face peripheral area, while directing to project said flash light with high intensity to a surrounding area not including said face peripheral area so that said average brightness value of said surrounding area becomes higher than said threshold value.

6. An image capturing apparatus as claimed in claim 4, wherein when said average brightness value of said face peripheral area is lower than said threshold value, said control section directs to project said flash light with low intensity to said face peripheral area so that said average brightness value of said face peripheral area becomes approximately equal to said threshold value, while directing to project said flash light with high intensity to a surrounding area not including said face peripheral area so that said average brightness value of said surrounding area becomes higher than said threshold value.

7. An image capturing apparatus as claimed in claim 1, further comprising:
a color temperature detecting section for detecting color temperature of said subject, wherein said control section controls illumination of said red LEDs, said green LEDs and said blue LEDs in each group based on said detection result of said face detecting section and a detection result of said color temperature detecting section so that said groups separately project said flash lights having different color temperature determined for each of said divided projection areas.

8. An image capturing apparatus as claimed in claim 7, wherein said control section directs to project said flash light to said divided projection areas including said person's face, said flash light having color temperature that corrects a color of said face into an appropriate skin color.

9. An image capturing apparatus as claimed in claim 7, wherein said control section directs to project said flash light to said divided projection areas not including said person's face, said flash light having color temperature same as color temperature of said divided projection areas not including said person's face.

10. An image capturing apparatus as claimed in claim 7, wherein said face detecting section searches both eyes of said person in said image to detect said person's face.

11. An image capturing apparatus as claimed in claim 7, wherein said face detecting section regards a midpoint of said both eyes as said position of said person's face.

12. An image capturing apparatus as claimed in claim 7, wherein said face detecting section regards a distance between said both eyes as said size of said person's face.

13. An image capturing apparatus as claimed in claim 1, wherein said control section controls illumination of said LEDs such that said projection area becomes larger than said face detected by said face detecting section.

14. An image capturing apparatus as claimed in claim 13, wherein said projection area extends downward from said face.

15. An image capturing apparatus as claimed in claim 1, further comprising:
a photometry section for performing multi-metering to measure brightness of said subject;
wherein based on a result of said multi-metering said control section detects a position and brightness of a light source presenting in an area not including said face detected by said face detecting section and then controls said projection area and intensity of said flash light according to detected position and brightness of said light source.

16. An image capturing apparatus as claimed in claim 15, wherein said control section directs to project said flash light with high intensity to said face when said light source has high brightness.

17. An image capturing apparatus as claimed in claim 15, wherein said control section directs to project said flash light with low intensity to said face while directing to project said flash light to said area not including said face when said light source has low brightness.

18. An image capturing apparatus as claimed in claim 17, wherein said flash light to said area not including said face has a different color temperature from said flash light to said face.

* * * * *